(12) United States Patent
Nachbar et al.

(10) Patent No.: US 10,518,817 B2
(45) Date of Patent: Dec. 31, 2019

(54) METHOD FOR PRODUCING A JOINT CONNECTION BETWEEN A JOINT HOUSING AND A CONNECTION COMPONENT AND SUSPENSION COMPONENT AND CHASSIS PRODUCED ACCORDING TO THE METHOD

(71) Applicant: ZF FRIEDRICHSHAFEN AG, Friedrichshafen (DE)

(72) Inventors: Frank Nachbar, Osnabrück (DE); Volker Grube, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 338 days.

(21) Appl. No.: 15/015,813

(22) Filed: Feb. 4, 2016

(65) Prior Publication Data
US 2016/0229462 A1    Aug. 11, 2016

(30) Foreign Application Priority Data
Feb. 5, 2015    (DE) .................. 10 2015 202 092

(51) Int. Cl.
*F16C 11/06*    (2006.01)
*B23P 11/00*    (2006.01)
(Continued)

(52) U.S. Cl.
CPC .......... *B62D 27/023* (2013.01); *B62D 21/11* (2013.01); *B62D 65/02* (2013.01)

(58) Field of Classification Search
CPC ...... B62D 27/023; B62D 65/02; B62D 21/11; B60G 7/001; B60G 7/005;
(Continued)

(56) References Cited

U.S. PATENT DOCUMENTS

| | | | | |
|---|---|---|---|---|
| 2,209,975 A | * | 8/1940 | Jacobus | ............... F22B 37/104 122/511 |
| 4,148,119 A | * | 4/1979 | McEowen | ............ B23P 15/003 29/898.051 |

(Continued)

FOREIGN PATENT DOCUMENTS

| | | |
|---|---|---|
| DE | 10 2004 031 494 | 1/2006 |
| DE | 10 2010 043 038 | 5/2012 |
| WO | WO 2011/068 752 | 6/2011 |

OTHER PUBLICATIONS

FR 2379337 w/ Machine translation; Robert Bayle, Published date: Sep. 1, 1978; Process for forming an adjustable ball joint box made of composite elements, Republic of France, No. 77 02933; English Machine translation attached at end 12 pages relied on.*

*Primary Examiner* — Ryan J. Walters
*Assistant Examiner* — Lawrence Averick
(74) *Attorney, Agent, or Firm* — Cozen O'Connor

(57) ABSTRACT

A method for producing a joining connection between a joint housing and at least one connection component including: providing a blank for the fabrication of the joint housing, and providing a connection component with a joint receptacle inserting the blank into the joint receptacle of the connection component and producing the joint housing through forming by cold extrusion of the inserted blank. An undercut positive-engagement joining connection is generated between the joint housing and the connection component during the cold extrusion process through transverse extrusion and/or upsetting. A chassis component has a structural component part with at least one joint receptacle formed as orifice and a joint housing for a joint device, which joint housing is inserted into this joint receptacle and fastened to the structural component part.

9 Claims, 2 Drawing Sheets a.)

b.)

c.)

d.)

(51) Int. Cl.
*B62D 27/02* (2006.01)
*B62D 21/11* (2006.01)
*B62D 65/02* (2006.01)

(58) Field of Classification Search
CPC .......... B60G 2204/416; B60G 2206/11; B60G 2206/8105; B60G 2206/82; B60G 2206/8209; F16C 11/0695; F16C 11/0685; F16C 2326/05; F16C 11/0619; B23P 2700/14; B23P 11/005; B23P 2700/11
See application file for complete search history.

(56) References Cited

U.S. PATENT DOCUMENTS

| | | | | |
|---|---|---|---|---|
| 4,256,413 A * | 3/1981 | Abe | ................ | B62D 7/16 403/122 |
| 5,413,431 A * | 5/1995 | Fellows | ................ | B60G 7/005 277/635 |
| 5,752,317 A * | 5/1998 | Keating | ................ | B21D 39/06 29/723 |
| 6,286,213 B1 * | 9/2001 | Hada | ................ | F02M 35/10144 29/507 |
| 6,960,333 B2 * | 11/2005 | Blanda, Jr. | ................ | C01C 3/022 165/134.1 |
| 7,261,487 B2 * | 8/2007 | Urbach | ................ | B60G 7/005 403/114 |
| 7,367,743 B2 * | 5/2008 | Bernhardt | ................ | F16C 11/0695 403/122 |
| 8,757,916 B2 * | 6/2014 | Orend | ................ | B29C 65/08 403/136 |
| 9,435,481 B2 * | 9/2016 | Bienentreu | ................ | F22B 37/107 |
| 9,446,644 B2 * | 9/2016 | Wilcutt | ................ | B60G 7/005 |
| 2003/0170069 A1 * | 9/2003 | Suzuki et al. | ................ | F16D 1/12 |
| 2003/0192680 A1 * | 10/2003 | Blanda, Jr. | ................ | C01C 3/022 165/134.1 |
| 2006/0153632 A1 * | 7/2006 | Bernhardt | ................ | F16C 11/0695 403/122 |
| 2012/0170969 A1 * | 7/2012 | Forthaus | ................ | F16C 7/02 403/50 |
| 2015/0308731 A1 * | 10/2015 | Viklund | ................ | F28F 9/264 165/61 |
| 2016/0049705 A1 * | 2/2016 | Mahe | ................ | H01M 10/625 429/120 |
| 2016/0121678 A1 * | 5/2016 | Meier | ................ | B60G 7/005 280/124.134 |
| 2016/0281772 A1 * | 9/2016 | Eulerich | ................ | B23K 9/16 |

* cited by examiner

METHOD FOR PRODUCING A JOINT CONNECTION BETWEEN A JOINT HOUSING AND A CONNECTION COMPONENT AND SUSPENSION COMPONENT AND CHASSIS PRODUCED ACCORDING TO THE METHOD

BACKGROUND OF THE INVENTION

1. Field of the Invention

The invention is directed to a method for producing a joining connection between a joint housing, particularly a ball joint housing, and at least one connection component and a chassis component for a motor vehicle that has at least one joint device, particularly a ball joint device, or at least one joint housing, particularly a ball joint housing.

2. Description of the Related Art

A method for producing a chassis component having a ball joint integrated in a structural component part is described in DE 10 2010 043 038 A1. First, the structural component part and the ball joint are produced independently of one another. The structural component part has a joint receptacle formed as an orifice, and the ball joint comprises a joint cartridge serving as joint housing and a ball stud rotatably and swivelably mounted therein. The ball joint is then inserted into the joint receptacle and the joint cartridge of the ball joint is welded to the structural component by laser beam welding. In a variant of the method, only the joint cartridge is initially fixedly connected to the structural component part and only subsequently assembled to form a joint.

DE 10 2004 031 494 A1 describes the fastening of a ball joint device to a chassis element of a motor vehicle in which an annular housing surrounding the ball element (ball stud) is press-fitted to the chassis element by means of press-fitting tools.

SUMMARY OF THE INVENTION

It is an object of the invention to provide an improved method for producing a joining connection between a joint housing, particularly a ball joint housing, and at least one connection component.

A method according to one embodiment of the invention includes the following steps: providing a blank for the fabrication of the joint housing; providing the connection component that has (at least) one joint receptacle formed as an orifice; inserting the blank into the joint receptacle of the connection component; and producing the joint housing by cold extrusion of the inserted blank, wherein an undercut positive-engagement joining connection is generated or formed between the joint housing and the connection component during the cold extrusion process through transverse extrusion and/or upsetting of the blank or blank material.

Cold extrusion is the selective forming of a cold blank within a shape-imparting die or cavity, wherein the material flows under the force of at least one punch. Transverse extrusion is a material flow occurring transverse to the operative direction of the punch, for which high punch forces are generally required. Upsetting is a localized cross-sectional enlargement, transverse to the operative direction of the punch of the blank or workpiece, which cross-sectional enlargement does not take place freely but rather in a defined manner within the die through a reduction in length in operative direction of the punch.

The blank is a cold extrusion slug formed of a metal material, particularly a steel material or aluminum material. It is preferably a turned part or forging, which can have a rotationally symmetrical shape. The blank can have an initial shape based on the shape of the joint receptacle to be produced. During the cold extrusion process, the blank is formed into the joint housing, particularly a cartridge-like ball joint housing. An inner geometry and an outer geometry are generated by the cold extrusion. In particular, the cold extrusion is carried out in one step, i.e., it is a one-step cold extrusion process, although a multistep cold extrusion or multistep cold extrusion process is also possible. In a multistep cold extrusion, the insertion of the blank is preferably carried out before the first forming step. The joint housing can receive a joint stud, particularly a ball stud, in a known manner and therefore has a shape-corresponding inner geometry, i.e., an inner geometry corresponding to the shape of the joint stud or ball stud. This inner geometry is first generated during the cold extrusion and, in particular, needs no finishing, i.e., the inner geometry of the joint housing generated by the cold extrusion is preferably a finished inner geometry or final inner geometry. The same applies in an analogous manner to the outer geometry of the joint housing. A hollow body, which is open at both of its axial ends and forms the joint housing is preferably generated in the cold extrusion. After insertion of the joint stud, the joint housing can be closed in a known manner.

The connection component is the component part to which the joint housing to be manufactured is fastened. Accordingly, the connection component serves as a support part for the joint device. This connection component has a joint receptacle formed as an orifice, e.g., as a passage or through-bore, in which the joint housing fits (as is known, e.g., from DE 10 2010 043 038 A1). The connection component is preferably formed of a metal material, particularly a steel material or aluminum material. In particular, it is a casting, forging or sheet-metal part. The connection component can also be formed of a plastics material or plastics composite material.

A method according to one embodiment of the invention provides that an undercut positive-engagement joining connection between the joint housing and the connection component is generated already directly in or during the forming fabrication of the joint housing by cold extrusion of the blank. The joint housing and the joining connection to the connection component are generated simultaneously, so to speak; that is, within the cold extrusion process for producing the joint housing, this joint housing is simultaneously connected to the connection component in such a way that an undercut positive-engagement, or particularly also frictional-engagement, joining connection is formed between these two structural component parts. As a result of the generated undercut positive-engagement joining connection, the joint housing is rigidly and inseparably held or fixed in the joint receptacle of the connection component. This prevents loosening and/or disengagement or detachment of the joint housing in axial direction or longitudinal direction the axial direction or longitudinal direction usually corresponds to the insertion axis of the blank and preferably also in transverse direction or radial direction, which usually extends perpendicular to the longitudinal direction. Accordingly, a positive-engagement and frictional-engagement joining connection is preferably generated in both longitudinal direction and transverse direction.

Undercut denotes a positive-engagement and frictional-engagement connection between the joint housing and the connection component. This undercut connection is preferably generated by cold forming such that material of the joint housing displaced during the cold forming accumulates at an annular collar surrounding the orifice of the joint receptacle of the connection component and so that a positive-engagement and frictional-engagement connection results around the rim of the orifice.

The undercut positive-engagement joining connection between the joint housing and the connection component can be generated economically without an additional work step and without additional joining elements. For this purpose, the blank and the connection component are preferably brought together in a suitable manner; for example, the connection component can be channeled into the production line for the joint housing for this purpose. Further, the joining according to one embodiment of the invention is relatively impervious to manufacturing tolerances in the mating member (connection component and blank). Further, degrees of freedom in shaping and diverse material combinations are made possible. In this regard, the blank and the connection component can be formed of different materials and particularly of different metal materials (for example, aluminum material and a steel material). The joining according to the invention has no disadvantageous effect on the joint functions of the joint device.

Accordingly, with the method according to the invention a component composite can be produced, or a component composite is produced, which has at least one connection component with at least one joint receptacle formed as an orifice and a joint housing, particularly a ball joint housing, which is fastened in this joint receptacle. An undercut positive-engagement joining connection which is generated through forming by transverse extrusion and/or upsetting is formed between the joint housing and the connection component preferably in such a way that the joint housing overlaps the orifice rims of the joint receptacle in a transverse direction or radial direction on both sides of the connection component, particularly in a circumferential manner, so that a positive-engagement and frictional-engagement connection is formed in longitudinal direction or axial direction as well as in transverse direction or radial direction. This component composite is preferably a chassis component which is the subject matter of the further independent patent claim.

It is preferably provided that the blank has a circumferential annular collar which, on the one hand, can serve as a stop when the blank is inserted into the joint receptacle of the connection component and, on the other hand, can serve to transmit shaping force, i.e., deforming forces, into the blank during the cold extrusion. Accordingly, the annular collar has multiple functions. Further, it is preferably provided that this annular collar is not deformed during the cold extrusion, by which is meant that, at most, it is only deformed insignificantly. This undeformed annular collar can further function as (first) positive-engagement element which, on one side of the connection component, overlaps the orifice rim of the joint receptacle on that side circumferentially (i.e., along the entire circumference) in transverse direction or radial direction. During cold extrusion, a further (second) positive-engagement element which circumferentially overlaps the other orifice rim in transverse direction or radial direction can be generated on the other side of the connection component by transverse extrusion and/or upsetting. Accordingly, the joint housing produced preferably has two positive-engagement elements which circumferentially overlap the opposite orifice rims of the joint receptacle. In a preferred manner, a smaller overlapping of the orifice rim is generated in transverse direction or radial direction with the (second) positive-engagement element formed by transverse extrusion and/or upsetting and which overlaps the other orifice rim than with the undeformed circumferential annular collar (first positive-engagement element), so that the two positive-engagement elements which overlap the opposite orifice rims of the joint receptacle overlap the orifice rims differently in transverse direction or radial direction and to this extent are constructed asymmetrically with respect to one another.

The chassis component according to one embodiment of the invention for a motor vehicle comprises a structural component part that has at least one joint receptacle formed as orifice, e.g., as passage, and a joint housing, particularly a ball joint housing, for a joint device, particularly a ball joint device, which joint housing is inserted into this joint receptacle and fastened to the structural component part. An undercut positive-engagement joining connection generated through application of the method according to the invention by transverse extrusion and/or upsetting is formed between the joint housing and the structural component part such that the joint housing has positive-engagement elements which circumferentially overlap the orifice rims of the joint receptacle on both sides of the structural component part. There is a fixed, non-detachable positive-engagement and frictional-engagement connection between the joint housing and structural component part in longitudinal direction or axial direction and in transverse direction or radial direction, and the structural component part functions as connection component for the joint housing.

It is preferably provided that the positive-engagement elements of the joint housing which overlap the orifice rims of the joint receptacle have different overlaps of the orifice rims in transverse direction or radial direction in a manner analogous to the descriptions above.

The chassis component according to one embodiment of the invention can also have at least one joint device, particularly a ball joint device, which is formed by the joint housing fastened to the structural component part and a joint stud, particularly a ball joint stud, received therein, and can possibly also have further individual parts (e.g., a joint shell or bearing shell, a bellows seal, etc.). Accordingly, the chassis component has at least one installed joint device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

The invention will be described more fully in the following with reference to the drawings by way of example and without limiting generality. The features which are shown in the drawings and/or described in the following can further develop the invention also isolated from specific combinations of features.

DETAILED DESCRIPTION OF THE PRESENTLY PREFERRED EMBODIMENTS

Figure 1:
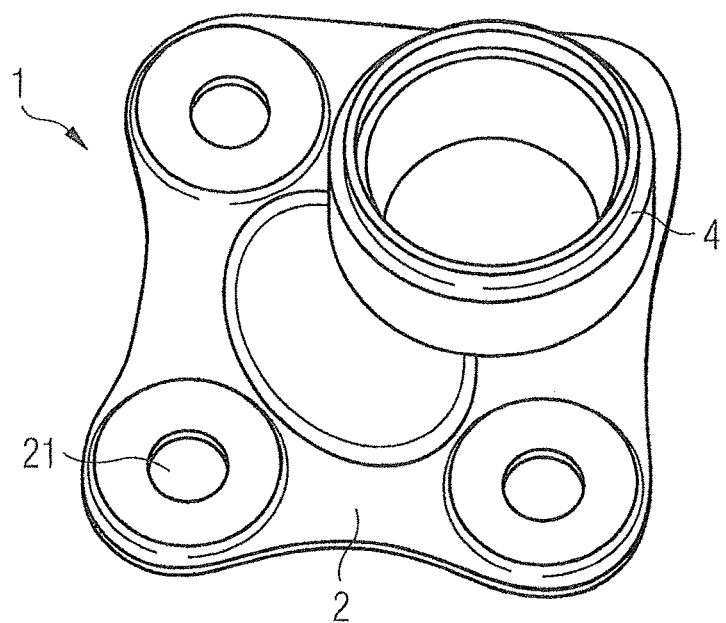
FIG. 1 is a perspective view of a chassis component.

The chassis component 1 shown in FIG. 1 is a flange joint which has a structural component part 2 formed as flange with a plurality of holes 21 and a ball joint housing 4 fastened thereto. There is an undercut positive-engagement joining connection between the ball joint housing 4 and the structural component part 2 functioning as connection component. The production of the undercut positive-engagement joining connection will be explained in the following referring to FIG. 2.

FIG. 2a shows a rotationally symmetrical blank 40 for producing the ball joint housing 4. The blank 40 has a longitudinal axis L corresponding to the longitudinal direction. The transverse direction or radial direction extending perpendicular to this longitudinal axis L is designated by R. The ball joint housing 4 to be produced has the same axes and directions. The blind hole-shaped blank 40 has an initial shape suitable for the subsequent cold extrusion process and is formed with a circumferential annular collar 42 at its outer circumferential surface. The structural component part 2 has a joint receptacle 22 formed as a shape-corresponding passage, the blank 40 being inserted into this joint receptacle 22 until the circumferential annular collar 42 encounters and rests against the structural component part 2 in axial direction L as is shown in FIG. 2b. A bevel 41 at the blank 40 and an annular gap S (which can have a radial gap dimension of up to a few tenths of a millimeter, for example) are conducive to a simple, tilt-free insertion of the blank 40 or positioning of the structural component part 2.

The inserted blank 40 is subsequently formed into the ball joint housing 4 by cold extrusion comprising one or more steps. During the cold extrusion process, as is shown in FIG. 2d, an undercut positive-engagement joining connection is generated between the produced ball joint housing 4 and the structural component part 2 by transverse extrusion and/or upsetting. In this regard, the annular collar 42 also serves to transmit deforming forces as is indicated by arrows F in FIG. 2c. The annular collar 42 stays substantially undeformed during the cold extrusion and later serves as positive-engagement element which circumferentially overlaps the orifice rim of the joint receptacle 22 in transverse direction or radial direction R on one side (the lower side in the drawing). During the cold extrusion, as a result of the transmitted forces F a positive-engagement element 43 which circumferentially overlaps the orifice rim of the joint receptacle 22 in transverse direction or radial direction R is also generated on the other side (the upper side in the drawing) by a transverse extrusion and/or upsetting process. During cold extrusion, the other (upper) orifice rim is molded over, so to speak, in transverse direction or radial direction R, but a smaller overlapping of the orifice rims is generated with respect to the annular collar 42; however, this smaller overlapping is sufficient for the positive engagement function.

Finally, the produced ball joint housing 4 has two positive-engagement elements 42 and 43, which circumferentially overlap the orifice rims of the joint receptacle 22 on both sides of the structural component part 2 such that a positive-engagement and frictional-engagement connection is formed (see FIG. 2d) in longitudinal direction L and in transverse direction R. The two positive-engagement elements 42 and 43 are spaced apart in axial direction L corresponding to the thickness of the structural component part 2 at the joint receptacle 22 and have different extensions in transverse direction or radial direction R so that the opposite orifice rims of the joint receptacle 22 are overlapped differently. With respect to their radial extensions, the two positive-engagement elements 42 and 43 of the ball joint housing 4 are formed asymmetrically with respect to one another.

The ball joint housing 4 produced by cold extrusion that substantially has a final geometry is already fixedly connected to the structural component part 2 during its production. The joining connection is weight-neutral, able to withstand extreme stress, stable and resistant to corrosion. Further, this joining connection can be produced economically. The connection is carried out neither by a simple press fit nor by a positive engagement generated by bending or flanging, but rather by an undercut positive engagement generated according to the invention already during the fabrication of the ball joint housing 4 by transverse extrusion, by upsetting, or by transverse extrusion and upsetting.

Figure 2:
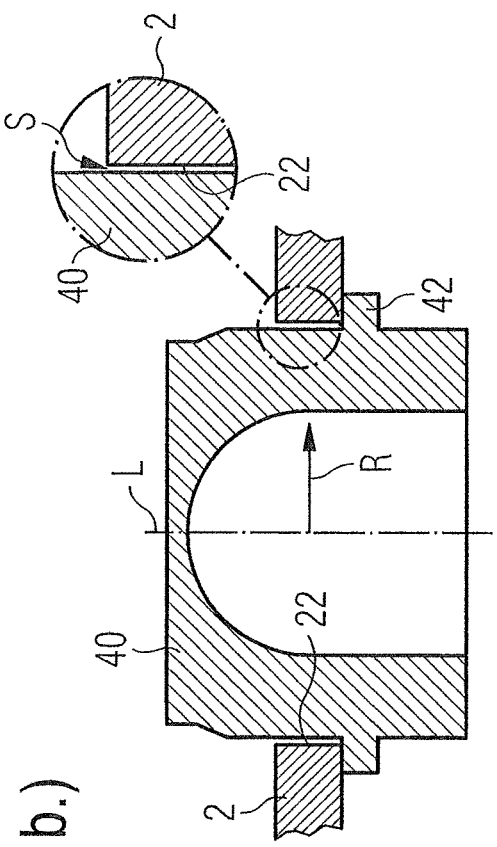
FIG. 2 illustrates the production of the chassis component shown in FIG. 1 in a number of schematic sectional views.
Figure 2:
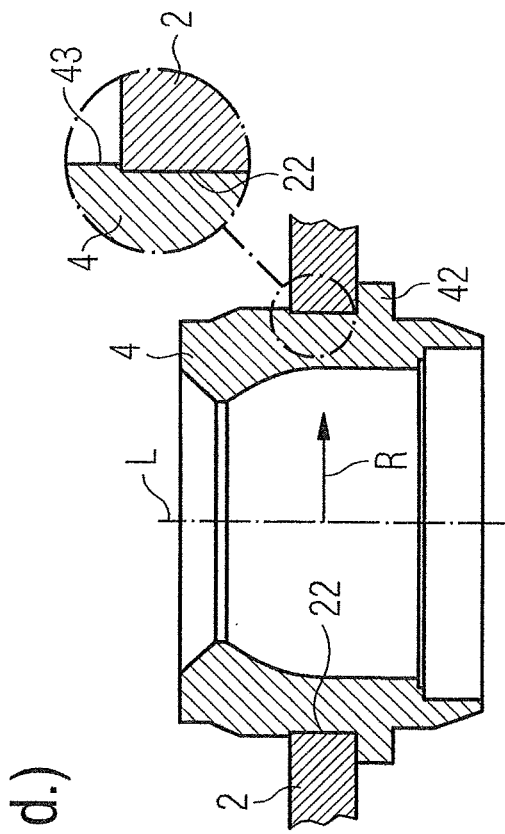
Figure 2:
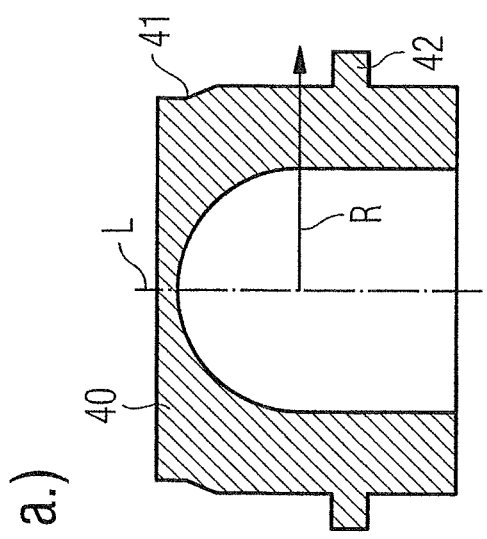
Figure 2:
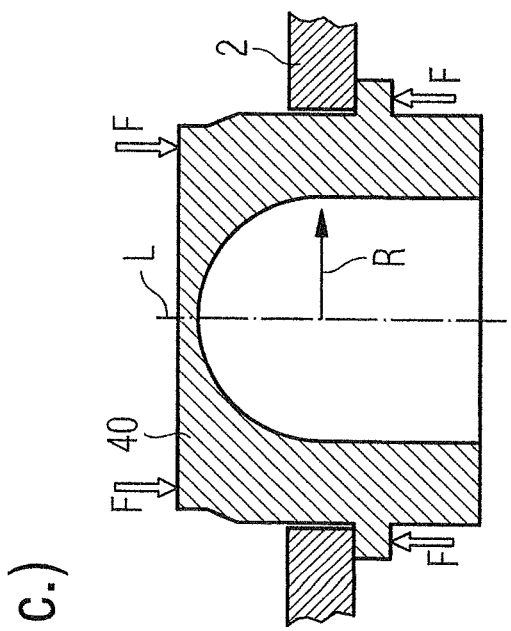

The ball joint housing 4 and the structural component part 2 can be formed of different materials (for example, steel and aluminum). The ball joint housing 4 shown in FIG. 1 and FIG. 2 is a substantially rotationally symmetrical hollow body that is open at both axial ends and has a substantially finished inner geometry and outer geometry. After insertion of the ball stud, the ball joint housing 4 can be closed in a known manner, e.g., by molding on an inwardly directed collar and/or by fitting a cover. As shown in the drawing, the ball stud is inserted from the bottom and projects out at the top).

Figure 3:
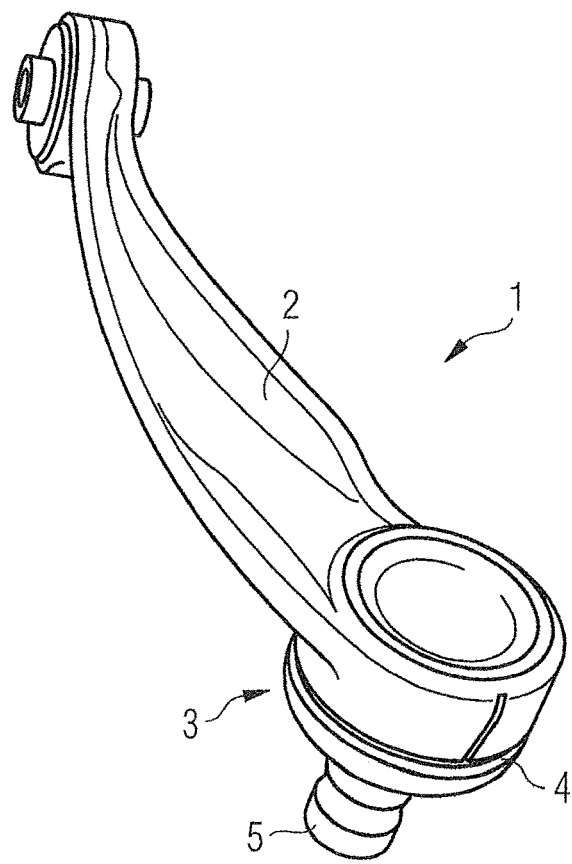
FIG. 3 shows a perspective view of another chassis component.

The chassis component 1 shown in FIG. 3 is a crossmember having a structural component part 2 formed as support arm and a joint device 3 fastened to the structural component part 2. The joint device 3 in the depicted example is a ball joint device. The joint device 3 comprises a joint housing or ball joint housing 4 and a joint stud or ball joint stud 5 mounted therein. The joint housing 4 is connected to the support arm or structural component part 2 in a manner that has already been described.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for producing a joining connection between a joint housing and at least one connection component comprising:
   providing a blank for the fabrication of the joint housing;
   providing the connection component having a joint receptacle formed as an orifice;
   inserting the blank into the joint receptacle of the connection component; and producing the joint housing directly between the blank and the joint receptacle of the connection component by cold extrusion of the inserted blank, and generating an undercut positive-engagement joining connection between the joint housing and both axial ends of the joint receptacle of the connection component simultaneously during the cold extrusion process through transverse extrusion and/or upsetting, wherein the blank has a circumferential annular collar configured as a preexisting stop against which the connection component rests prior to the cold extrusion when inserting the blank into the joint receptacle of the connection component and to transmit force during the cold extrusion.

2. The method according to claim 1, wherein the cold extrusion process is carried out in one step.

3. The method according to claim 1, wherein the circumferential annular collar is at most minimally deformed during the cold extrusion and functions as positive-engagement element which, on one side of the connection component, overlaps an orifice rim of the joint receptacle, and wherein a further positive-engagement element that circumferentially overlaps the other orifice rim on the other side of the connection component is generated during cold extrusion by the transverse extrusion and/or upsetting.

4. The method according to claim 3, wherein a smaller overlapping of the orifice rim is generated with the positive-engagement element that overlaps the other orifice rim than with the circumferential annular collar.

5. The method according to claim 1, wherein a hollow body that is open at both of its ends is generated during the cold extrusion.

6. The method according to claim 1, wherein the blank and the connection component are formed from different materials.

7. The method according to claim 1, wherein the joint housing is a ball joint housing.

8. The method according to claim 1, wherein the circumferential annular collar is at most minimally deformed during the cold extrusion.

9. The method according to claim 1, wherein the blank is deformed on a side of the connection component opposite the circumferential annular collar during the cold extrusion to axially retain the connection component.

* * * * *